United States Patent
Moubarak et al.

(10) Patent No.: US 11,167,649 B2
(45) Date of Patent: Nov. 9, 2021

(54) METHODS AND SYSTEM FOR DISCONNECTING AN AXLE

(71) Applicant: Ford Global Technologies, LLC, Dearborn, MI (US)

(72) Inventors: Paul Moubarak, Redford Township, MI (US); Joseph Torres, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 501 days.

(21) Appl. No.: 16/156,907

(22) Filed: Oct. 10, 2018

(65) Prior Publication Data

US 2020/0114769 A1 Apr. 16, 2020

(51) Int. Cl.
| | |
|---|---|
| *B60K 17/348* | (2006.01) |
| *B60L 15/20* | (2006.01) |
| *B60B 35/14* | (2006.01) |
| *F16D 11/00* | (2006.01) |
| *F16D 48/06* | (2006.01) |
| *B60W 10/02* | (2006.01) |
| *B60W 10/08* | (2006.01) |
| *B60K 1/02* | (2006.01) |
| *B60K 17/356* | (2006.01) |
| *B60K 17/02* | (2006.01) |

(52) U.S. Cl.
CPC ............. *B60L 15/20* (2013.01); *B60B 35/14* (2013.01); *B60K 1/02* (2013.01); *B60K 17/02* (2013.01); *B60K 17/348* (2013.01); *B60K 17/356* (2013.01); *B60W 10/02* (2013.01); *B60W 10/08* (2013.01); *F16D 11/00* (2013.01); *F16D 48/06* (2013.01); *B60L 2240/12* (2013.01); *B60L 2240/421* (2013.01); *B60L 2240/50* (2013.01); *B60W 2510/081* (2013.01); *B60W 2710/02* (2013.01); *B60W 2710/08* (2013.01); *B60Y 2200/91* (2013.01); *F16D 2500/1064* (2013.01); *F16D 2500/10406* (2013.01); *F16D 2500/1107* (2013.01)

(58) Field of Classification Search
None
See application file for complete search history.

(56) References Cited

U.S. PATENT DOCUMENTS

| | | | |
|---|---|---|---|
| 9,770,982 | B2 | 9/2017 | Nozu et al. |
| 2007/0193808 | A1 | 8/2007 | Perakes et al. |
| 2009/0321208 | A1 | 12/2009 | Schrand et al. |
| 2010/0094519 | A1* | 4/2010 | Quehenberger ..... B60W 10/119 701/69 |
| 2012/0259494 | A1 | 10/2012 | Schaeffer et al. |
| 2017/0274757 | A1* | 9/2017 | Iwano ............. B60W 30/18036 |
| 2019/0299766 | A1* | 10/2019 | Takada ...................... F16H 3/54 |
| 2020/0384978 | A1* | 12/2020 | Abe ....................... B60W 20/10 |

* cited by examiner

*Primary Examiner* — James M McPherson
(74) *Attorney, Agent, or Firm* — David Kelley; McCoy Russell LLP

(57) ABSTRACT

Methods and systems are provided for operating a vehicle that may be propelled via a primary axle and a secondary axle. In one example, a propulsion source of a secondary axle may be decoupled from at least one wheel via a dog clutch that includes teeth. The dog clutch may be disengaged in a way that reduces driveline noise and may reduce a possibility of driveline degradation.

20 Claims, 6 Drawing Sheets

METHODS AND SYSTEM FOR DISCONNECTING AN AXLE

FIELD

The present description relates generally to methods and systems for controlling a driveline of a vehicle. The methods and systems may be particularly useful for vehicles that are electrically propelled.

BACKGROUND/SUMMARY

A vehicle may include a primary axle to propel the vehicle and a secondary axle to propel the vehicle. The primary axle may receive a propulsion torque to accelerate the vehicle or to ensure that the vehicle continues to move along a desired path. The primary axle may always have each of its two half shafts coupled to a differential on one side and a wheel on the other side. This allows the wheels to rotate at different speeds while equalizing torque delivery between the two wheels. The primary axle may also receive torque from a powertrain propulsion source at all vehicle speeds when driver demand torque exceeds driveline losses. Conversely, the secondary axle may receive torque from a driveline propulsion source only when the driveline is locked in a particular mode (e.g., four wheel drive). However, if the secondary axle selectively receives power from an electrically operated driveline propulsion source (e.g., an electric machine, such as a motor), then the electrically operated driveline propulsion source may generate back electromotive force (back EMF) when the electrically operated driveline propulsion source is not powered to propel the vehicle. The back EMF may reduce driveline efficiency. Further, the electrically operated driveline propulsion source supplying power to the secondary axle may not be capable of providing useful power to the driveline at higher vehicle speeds unless the electrically operated driveline propulsion source is large. Therefore, it may be desirable to provide a way of supplying power to a secondary axle and reducing back EMF generated via a secondary axle.

The inventors herein have recognized the above-mentioned issues and have developed a vehicle operating method, comprising: opening a dog clutch of a secondary axle via a controller in response to a derivative of a speed of an electric machine supplying power to the secondary axle exceeding a threshold level, where the dog clutch includes teeth on a first side of the dog clutch and on a second side of the dog clutch.

By opening a dog clutch of a secondary axle in response to a derivative of a speed of an electric machine supplying power to the secondary axle exceeding a threshold level, it may be possible to provide the technical result of reducing back EMF in the electric machine that supplies power to the secondary axle. Additionally, noise and vibration caused by disengaging the dog clutch may be reduced. Further, the possibility of dog clutch degradation may be reduced since forces applied to the dog clutch may be reduced when the dog clutch is opened.

The present description may provide several advantages. In particular, the approach may reduce back EMF generated in an electric machine and improve driveline efficiency. Further, the approach may reduce driveline noise and vibrations that may occur during disengaging a dog clutch that includes teeth. In addition, the approach may reduce the possibility of driveline component degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
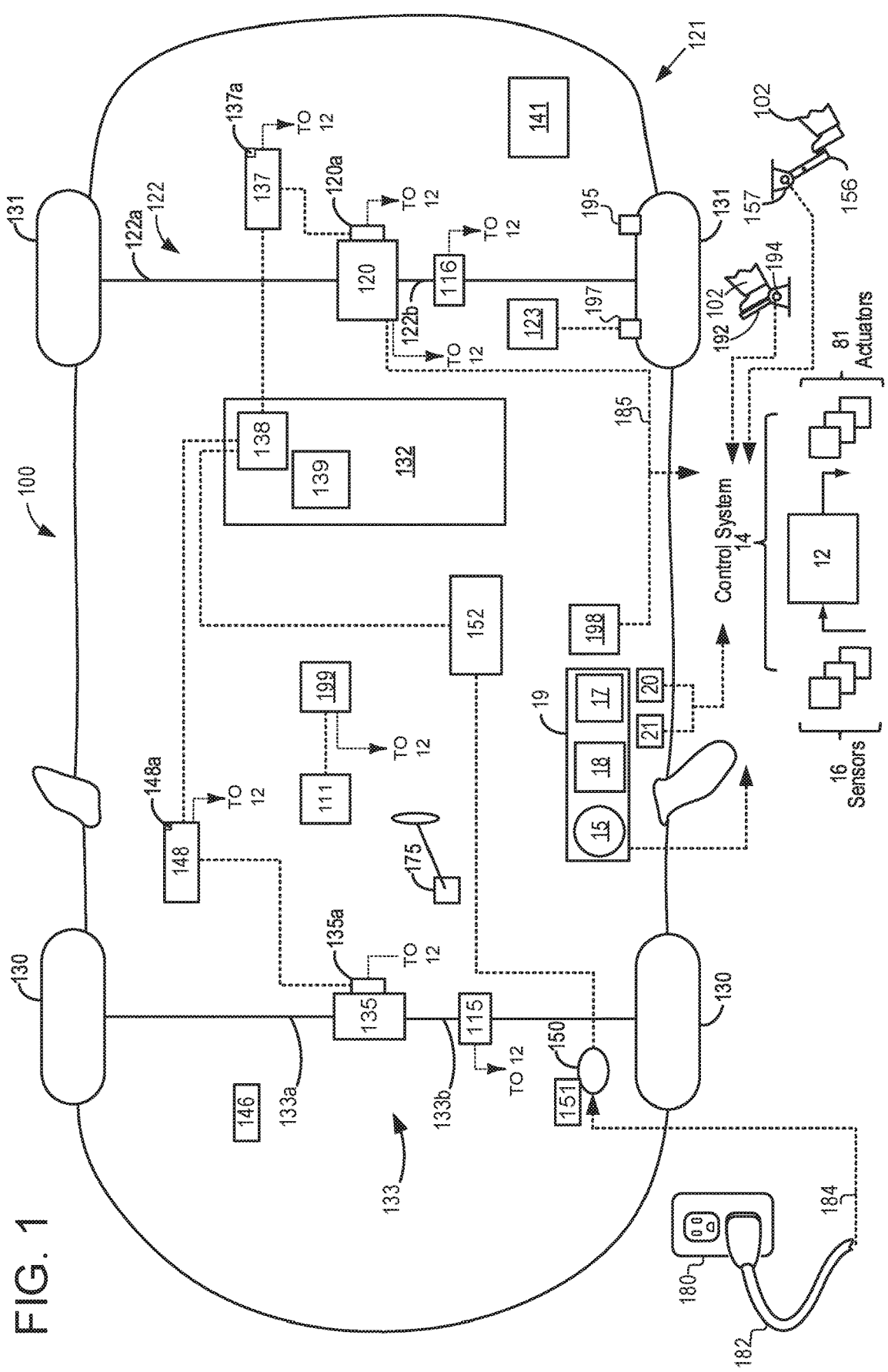
FIG. 1 is a schematic diagram of a vehicle driveline.
Figure 2:
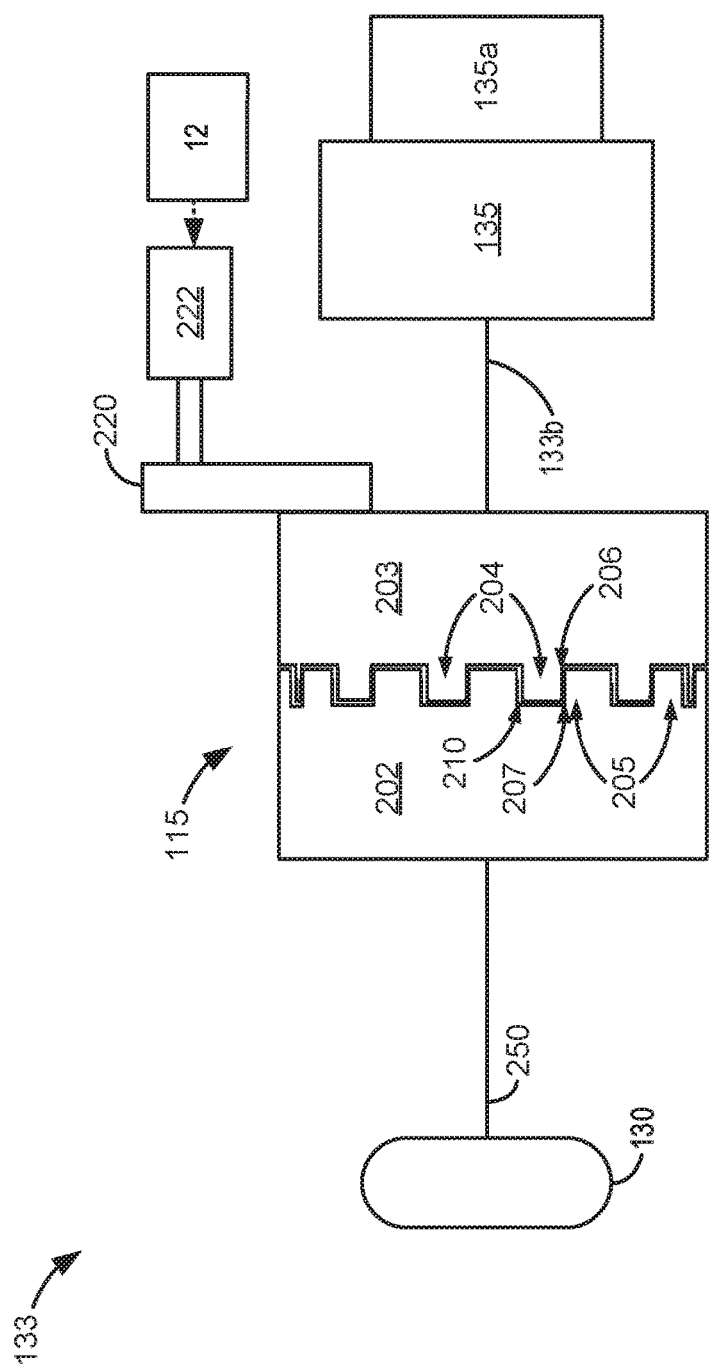
FIGS. 2-4 show various views of dog clutch operating conditions.
Figure 3:
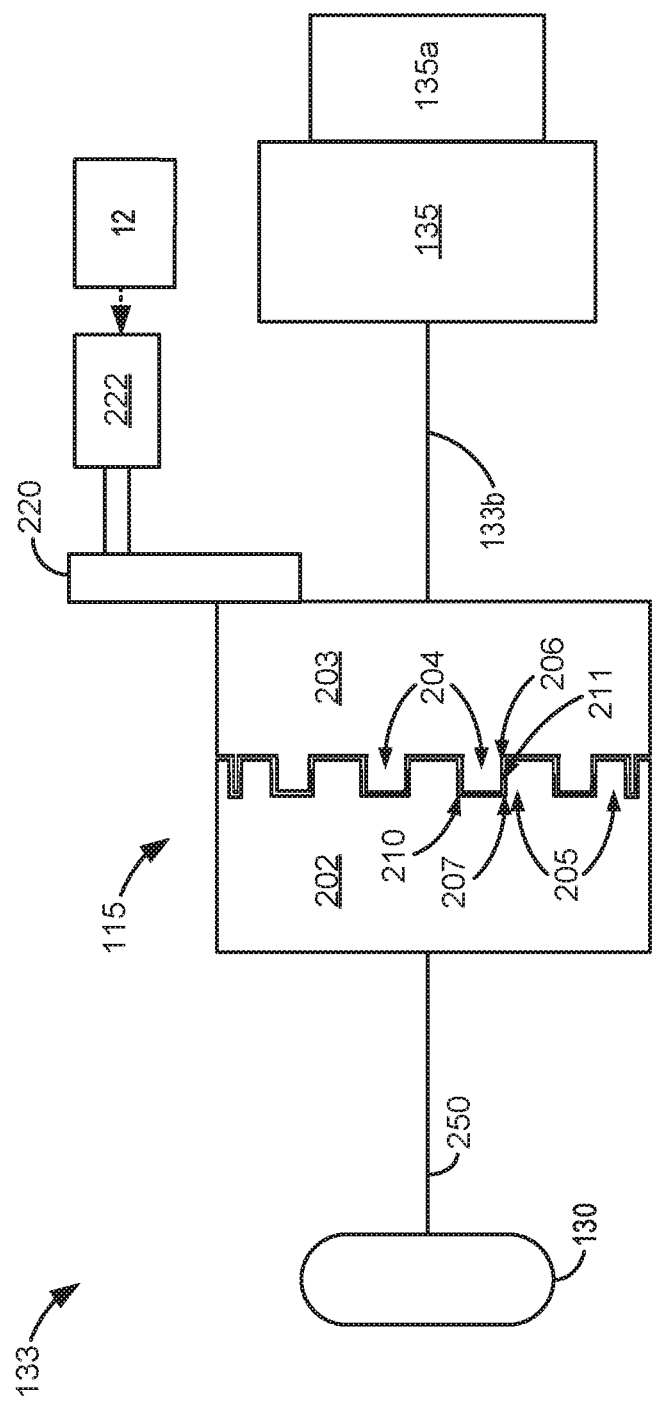
Figure 4:
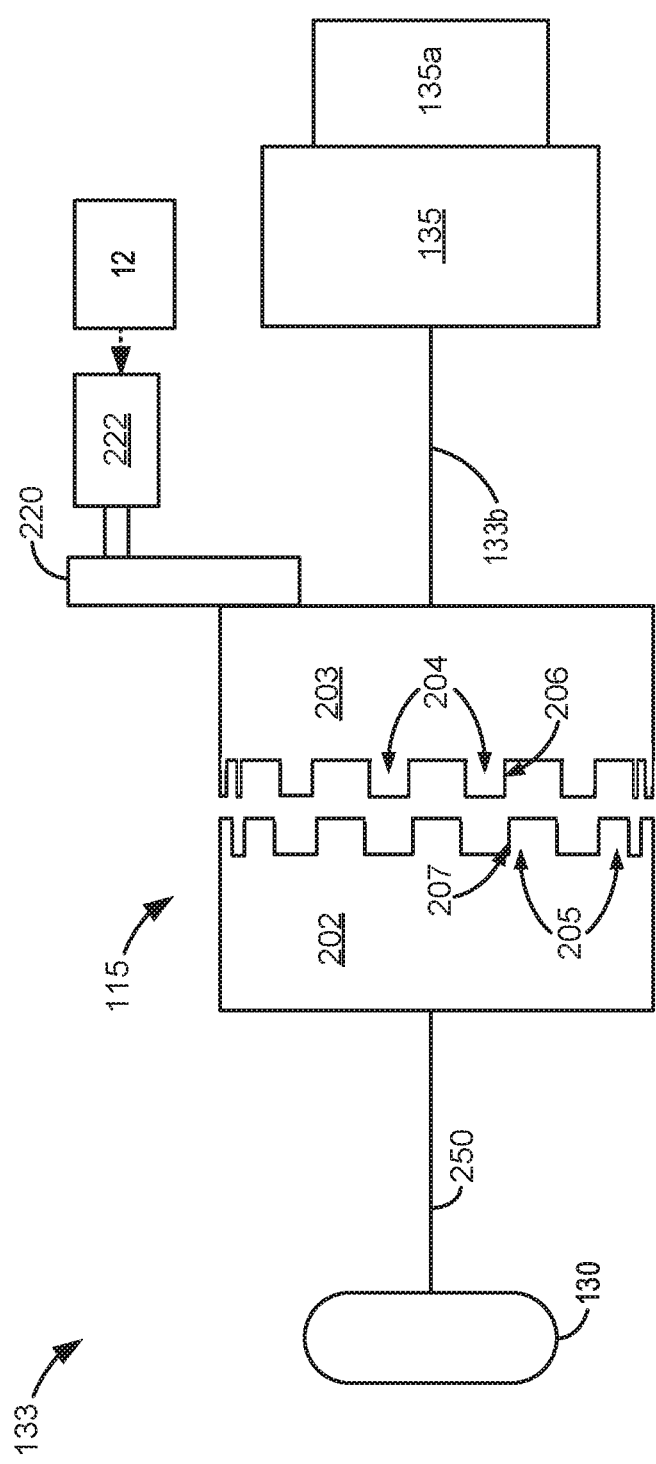
Figure 5A:
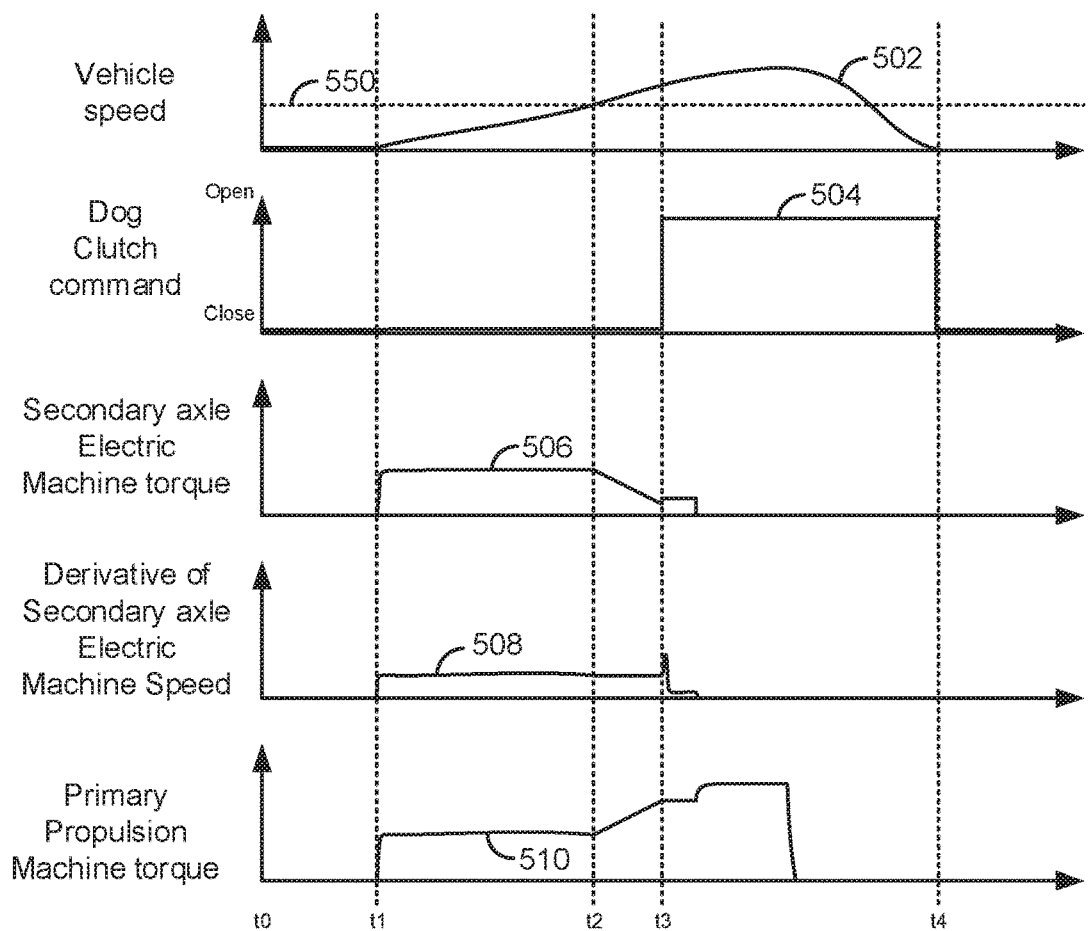
FIG. 5A is a prophetic vehicle operating sequence that includes opening of a dog clutch.
Figure 5B:
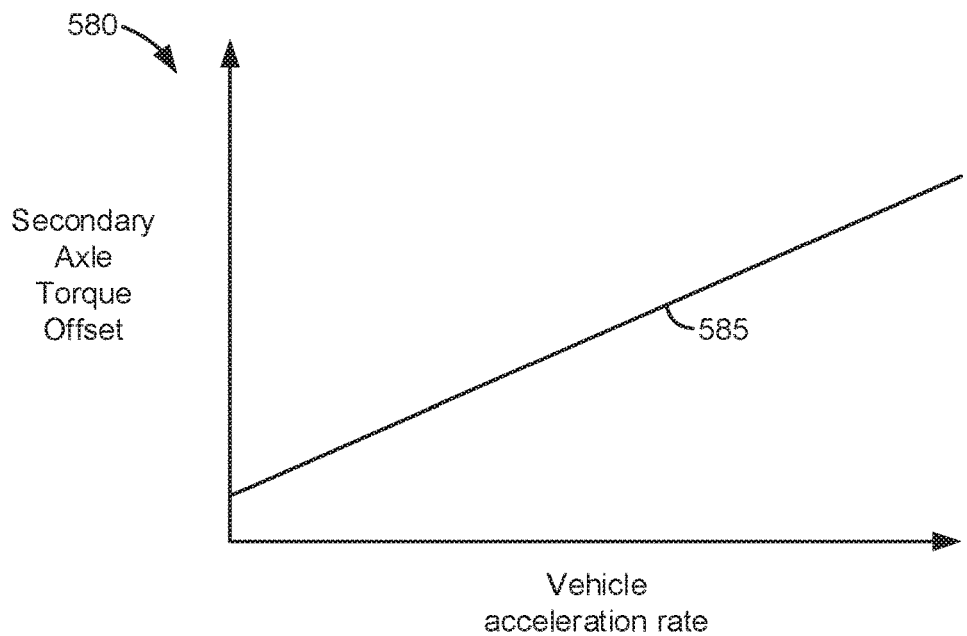
FIG. 5B is a plot of an example secondary axle torque offset value versus vehicle acceleration rate.
Figure 6:
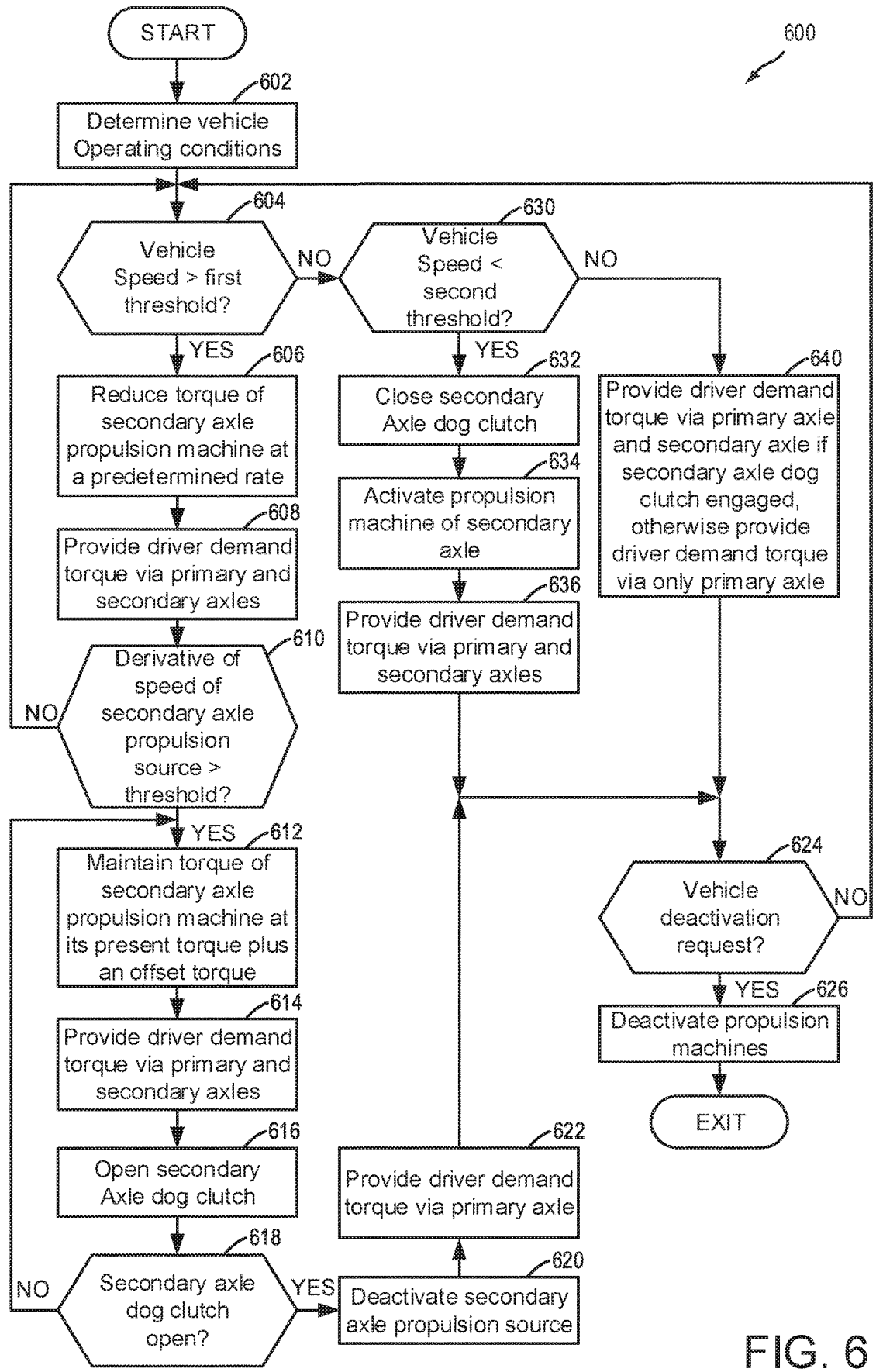
FIG. 6 is a flowchart of a method for operating a driveline that includes a secondary axle.

The following description relates to systems and methods for operating a vehicle. FIG. 1 shows an example vehicle system that includes a driveline with one or more electrical propulsion sources. Detailed views of the secondary axle system that is shown in the vehicle of FIG. 1 are shown in FIGS. 2-4. An example vehicle operating sequence to control a driveline according to the method of FIG. 6 is shown in FIG. 5A. Torque of a secondary axle electric machine during disengagement of a dog clutch may include an offset that is based on a vehicle acceleration rate as shown in FIG. 5B. A method for operating a vehicle driveline that includes a secondary axle is shown in FIG. 6.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120a and a second electric machine (e.g., a propulsive force electric machine) 135a for propelling vehicle 121. However, in other examples, vehicle 121 may include only one electrical machine for providing propulsive force. Electric machine 120a and electric machine 135a are controlled via controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12. In some examples, the vehicle propulsion system 100 may include an internal combustion engine in place of electric machine 120a.

Vehicle propulsion system 100 has a front axle 133 (e.g., secondary axle) and a rear axle 122 (e.g., primary axle). However, in some examples, the front axle 133 may be the primary axle and the rear axle 122 may be the secondary axle. The rear axle may receive a propulsion torque to accelerate the vehicle or to ensure that the vehicle continues to move along a desired path. The rear axle may always have each of its two half shafts 122a and 122b coupled to differential 120 on one side and a wheel 131 on the other side. This allows the wheels 131 to rotate at different speeds while equalizing torque delivery between the two wheels. The rear axle 122 may also receive torque from a powertrain propulsion source 120a at all vehicle speeds when driver demand torque exceeds driveline losses. Conversely, the front axle 133 may receive torque from a driveline propulsion source 135a only when vehicle speed is less than a threshold speed.

In some examples, rear axle 122 may comprise two half shafts, for example first half shaft 122a, and second half shaft 122b. The rear axle 122 also includes a differential gear set 120 (e.g., differential), and differential 120 may be mechanically coupled to electric machine 120a. Electric machine 120a and differential 120 are shown incorporated into rear axle 122. An optional dog clutch 116 is shown incorporated into rear axle 122 for examples where rear axle 122 is the secondary axle. Likewise, front axle 133 may comprise two half shafts, for example first half shaft 133a, and second half shaft 133b. The front axle 133 also includes a differential gear set 135 (e.g., differential), and differential 135 may be mechanically coupled to electric machine 135a. Electric machine 135a and differential 135 are shown incorporated into front axle 133. Dog clutch 115 is shown incorporated into front axle 133 for examples where front axle 133 is the secondary axle. Vehicle propulsion system 100 further includes front wheels 130 and rear wheels 131. In this example, front wheels 130 and/or rear wheels 131 may be driven via electrical propulsion sources (e.g., electric machines) 135a and 120a.

Electric machines 120a and 135a may receive electrical power from onboard electrical energy storage device 132. Power distribution box 138 may provide an interface between electrical energy storage device 132 and electric power consumers and suppliers. Furthermore, electric machines 120a and 135a may provide a generator function to convert the vehicle's kinetic energy into electrical energy, where the electrical energy may be stored at electric energy storage device 132 for later use by the electric machine 120a and/or 135a. A first inverter system controller (ISC1) 137 including switches (e.g., transistors) 137a may convert alternating current generated by electric machine 120a to direct current for storage at the electric energy storage device 132 and vice versa. A second inverter system controller (ISC2) 148 may convert alternating current generated by electric machine 135a to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120a, energy storage device 132, electric machine 135a, etc. Control system 14 may receive sensory feedback information from one or more of electric machine 135a, electric machine 120a, energy storage device 132, etc. Further, control system 14 may send control signals to one or more of electric machine 135a, electric machine 120a, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120a and electric machine 135a may propel the vehicle by utilizing a stationary electric power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include an ambient temperature/humidity sensor 198. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust electric machine output to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-byaxle basis (e.g., front axle and rear axle vehicle heights), or a single e height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1 shows a tire pressure sensor 197 coupled to wheel 131 and configured to monitor a pressure in a tire of wheel 131. While not explicitly illustrated, it may be understood that each of the four tires indicated in FIG. 1 may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a motor electronics coolant pump (MECP) 146. MECP 146 may be used to circulate coolant to diffuse heat generated by at least electric machine 120a and electric machine 135a of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, inertial sensors 199, etc. In some examples, steering angle sensor 175, sensors associated with electric machine 135 and electric machine 120, etc., may communicate information to controller 12, regarding various states of electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135a and electric machine 120a) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

FIG. 2 is a detailed schematic view of front axle system 133 shown in FIG. 1, which includes dog clutch 115. The secondary or front axle 133 in this example shows a configuration of one side of differential 135. In addition, electric machine 135a is supplying torque to wheel 130 via differential 135 while dog clutch 115 is engaged to allow torque transfer between the two sides 202 and 203 of dog clutch 115. The rear axle may be configured and operate in a similar way.

Differential 135 is shown mechanically coupled to half shaft 133b and electric machine 135a. Half shaft 133b is coupled to a first side 203 of dog clutch 115. First side 203 of dog clutch 115 includes teeth 204 that are configured to engage and disengage from teeth 205 of second side 202 of dog clutch 115. Second side of dog clutch 115 is mechanically coupled to wheel 130 via shaft 250.

First side 203 of dog clutch 115 may be selectively engaged with second side 202 of dog clutch 115 via shift forks 220 and dog clutch actuator (e.g., a solenoid) 222. Solenoid 222 may be commanded to open or close dog clutch 115 via controller 12 responsive to vehicle operating conditions as described in further detail herein.

Face 206 of teeth 204 may be in contact with face 207 of teeth 205 when electric machine 135a is supplying positive torque to wheels 130. A small clearance gap 210 may be present between back sides of teeth 204 and 205 when electric machine 135a is supplying positive torque to wheels 130. A small amount of clearance is provided between teeth 204 and 205 so that teeth 204 and 205 may engage each other to transfer torque from electric machine 135a to wheels 130.

Dog clutch 115 allows torque to be transmitted from electric machine 135a to wheels 130 when dog clutch 115 is fully engaged as shown. Further, dog clutch 115 allows torque to be transmitted from wheels 130 to electric machine 135a when dog clutch 115 is fully engaged as shown. Actuator 222 is adjusted to a position where teeth 204 fully engage teeth 205.

In this way, torque may be transferred from electric machine 135a to wheels 130 when the vehicle is operating at speeds that are less than a threshold speed. The teeth 204 and 205 allow torque transfer between first side 203 and second side 202 with little force being applied to maintain dog clutch 115 closed. Once dog clutch 115 is engaged, there may only be a finite amount of slip between first side 203 and second side 202. Thus, dog clutch 115 may provide a positive engagement between first side 203 and second side 202.

Referring now to FIG. 3, a second detailed schematic view of front axle system 133 is shown. One side of secondary or front axle 133 is shown in this example with differential 135. However, in this view, torque of electric machine 135a is adjusted to reduce force between teeth 204 and 205 so that first side 203 may be disengaged from second side 202 without producing a significant dog clutch releasing sound, a popping sound for example. The components shown in FIG. 3 are identical to and operate the same as described in FIG. 2, unless described differently below. Therefore, for the sake of brevity, the description of the secondary axle components is omitted.

Torque output of electric machine 135a may be reduced after the vehicle reaches a threshold speed while the vehicle continues to accelerate so that gaps 210 and 211 may form between teeth 204 and 205. The gaps may be caused via torque provided by the wheel to second side 202 exceeding torque provided by electric machine 135a such that the second side 202 of dog clutch 115 moves relative to the first side 203 of dog clutch 115, thereby generating gaps 210 and 211. Gap 211 may form between faces 206 and 207 of teeth 204 and 205. Alternatively, faces 206 and 207 may remain touching, but very little torque (e.g., less than a threshold amount of torque) may be transferred between first side 203 and second side 202 of dog clutch 115. Further, in some examples, back sides of teeth 204 and 205 may remain engaged, but with very little torque (e.g., less than a threshold amount of torque) being transferred between first side 203 and second side 202 of dog clutch 115. Because the amount of torque transferred between first side 203 and second side 202 is small, first side 203 may be retracted from and disengaged from second side 204 without generating a significant amount of noise between first side 203 and second side 204.

In this way, first side 203 may be retracted or disengaged from second side, or vice-versa, when vehicle speed exceeds a threshold speed so that less back EMF may be generated in electric machine 135a. Once dog clutch 115 is disengaged, electric machine 135a may be deactivated.

Referring now to FIG. 4, a third detailed schematic view of front axle system 133 is shown. One side of secondary or front axle 133 is shown in this example with differential 135. However, in this view, first side 203 of dog clutch 115 is decoupled or disengaged (e.g., separated so that the first side 203 may rotate relative to second side 202, or vice-versa, without contacting second side 202) from second side 202 of dog clutch 115. The components shown in FIG. 4 are identical to and operate the same as described in FIG. 2, unless described differently below. Therefore, for the sake of brevity, the description of the secondary axle components is omitted.

First side 203 of dog clutch 115 is shown completely disengaged from second side 202 of dog clutch 115 so that torque may not be transferred from first side 203 to second side 202, or vice-versa. By opening dog clutch 115, wheel 130 may rotate freely from a wheel on the opposite side if differential 135. Consequently, torque from a wheel on the opposite side of differential 135 that is directly coupled to half shaft 133a may spin half shaft 133b instead of electric machine 135a. The amount of torque that is transferred through differential 135 from half shaft 133a to half shaft 133b and electric machine 135a is equalized, but since half shaft 133b is allowed to freewheel, it provides little resistance so that it accelerates while electric machine 135a may not rotate or rotates slowly. Thus, by decoupling dog clutch 115, electric machine may be deactivated while generating little back EMF.

In this way, first side 203 may be retracted or disengaged from second side, or vise-versa, when vehicle speed exceeds a threshold speed so that less back EMF may be generated in electric machine 135a. Once dog clutch 115 is disengaged, electric machine 135a may be deactivated.

The system of FIGS. 1-4 provides for a vehicle system, comprising: a primary axle and a secondary axle, the secondary axle including a dog clutch having teeth and an actuator to open and close the dog clutch; a first electric machine mechanically coupled to the primary axle and a second electric machine mechanically coupled to the secondary axle; and a controller including executable instructions stored in non-transitory memory to accelerate a vehicle via the first and second electric machines, reduce power output of the second electric machine and increase output of the first electric machine when the vehicle reaches a threshold speed, and open the dog clutch when a derivative of a speed of the second electric machine exceeds a threshold level. The vehicle system further comprises additional instructions to deactivate the second electric machine after opening the dog clutch. The vehicle system further comprises additional instructions to maintain output of the electric machine when the derivative of the speed of the second electric machine exceeds the threshold level. The vehicle system includes where the dog clutch is opened via the actuator.

The vehicle system of claim 16, further comprising additional instructions to close the dog clutch in response to vehicle speed being less than a threshold speed.

Referring now to FIG. 5A, a prophetic operating sequence according to the method of FIG. 6 is shown. The vehicle operating sequence shown in FIG. 5A may be provided via the method of FIG. 6 in cooperation with the system shown in FIGS. 1 and 2. The plots shown in FIG. 5A occur at the same time and are aligned in time.

The first plot from the top of FIG. 5A is a plot of vehicle speed versus time. The vertical axis represents vehicle speed and the vehicle speed increases in the direction of the vertical axis arrow. The horizontal axis represents time and time increases from the left side of the figure to the right side of the figure. Trace 502 represents vehicle speed. Horizontal line 550 represents a vehicle speed above which a dog clutch of a secondary axle is disengaged so as to allow an electric machine that is coupled to the secondary axle to not rotate while the vehicle travels on a road.

The second plot from the top of FIG. 5A is a plot of a dog clutch command versus time. The vertical axis represents the dog clutch command state and the dog clutch is commanded open when trace 504 is at a higher level near the vertical axis arrow. The dog clutch is commanded closed when trace 504 is at a lower level near the horizontal axis. Trace 504 represents the state of the dog clutch command.

The third plot from the top of FIG. 5A is a plot of secondary axle electric machine output torque versus time. The vertical axis represents secondary axle electric machine output torque and the secondary axle electric machine output torque increases in the direction of the vertical axis arrow. The horizontal axis represents time and time increases from the left side of the figure to the right side of the figure. Trace 506 represents secondary axle electric machine output torque.

The fourth plot from the top of FIG. 5A is a plot of a derivative of the speed of the secondary axle electric machine versus time. The vertical axis represents the derivative of the speed of the secondary axle electric machine and the derivative of the speed of the secondary axle electric machine increases in the direction of the vertical axis arrow. The horizontal axis represents time and time increases from the left side of the figure to the right side of the figure. Trace 508 represents the derivative of the speed of the secondary axle electric machine.

The fifth plot from the top of FIG. 5A is a plot of primary axle electric machine output torque versus time. The vertical axis represents primary axle electric machine output torque and primary axle electric machine output torque increases in the direction of the vertical axis arrow. The horizontal axis represents time and time increases from the left side of the figure to the right side of the figure. Trace 510 represents the primary axle electric machine output torque.

At time t0, the vehicle is stopped and the dog clutch is closed. The secondary axle electric machine torque is zero and the primary axle electric machine torque is zero. The secondary axle electric machine speed derivative is also zero. The dog clutch is in a closed state.

At time t1, the driver demand torque is increased (not shown) and so the secondary axle electric machine torque and the primary axle electric machine torque are increased to meet the driver demand torque. The secondary axle electric machine speed derivative also increases as the vehicle accelerates responsive to the driver demand torque. The dog clutch remains in a closed state.

Between time t1 and time t2, the driver demand torque is maintained and so the secondary axle electric machine torque and the primary axle electric machine torque are continued to meet the driver demand torque. The secondary axle electric machine speed derivative is also maintained as the vehicle continues accelerating responsive to the driver demand torque. The dog clutch remains in a closed state.

At time t2, the driver demand torque is maintained (not shown) and the vehicle speed exceeds threshold 550 so secondary axle electric machine torque is commanded to be reduced at a predetermined rate. The vehicle continues accelerating via increasing torque output from the primary axle electric machine at a same rate as torque is reduced at the secondary axle electric machine. The secondary axle electric machine speed derivative continues at it previous level as the primary axle electric machine continues to supply torque to accelerate the vehicle. The dog clutch remains fully engaged and in a closed state so that the secondary axle electric machine is coupled to both front wheels.

At time t3, the reduction in the torque of the secondary axle electric machine torque has slowed the secondary axle electric machine speed relative to the speed of the vehicle's front wheels so that there is a change in the secondary axle electric machine speed derivative that exceeds a threshold value. This provides an indication that the torque that is applied between each half of the dog clutch is low. Therefore, the torque output from the secondary axle electric machine is maintained at the level it was when the secondary axle electric machine speed derivative exceeded the threshold value plus an offset torque. By maintaining the torque output from the secondary axle electric machine, it may be possible to keep an amount of torque that may be transferred across the dog clutch at a low level. In addition, the dog clutch is commanded open and the dog clutch fully opens while providing little audible indication of the dog clutch being disengaged. The vehicle continues to accelerate since torque is applied to the driveline via the primary axle electric machine. Shortly after time t3 the secondary axle electric machine is deactivated. The secondary axle electric machine may be deactivated by ceasing to change operating states of switches or transistors in an inverter that supplies electrical power to the secondary axle electric machine.

Between time t3 and time t4, the primary axle electric machine provides the requested driver demand torque (not shown) while the secondary axle electric machine remains deactivated. Little if any back EMF is generated in the secondary axle electric machine since the dog clutch is open. The secondary axle electric machine speed derivative value is zero since the secondary axle electric machine is deactivated and since the dog clutch is fully open. The vehicle speed increases and then decreases.

At time t4, the vehicle stops moving and the dog clutch is commanded engaged. The dog clutch is engaged so that the secondary axle electric machine is coupled to both front wheels. The driver demand torque is zero so that torque output from the primary and secondary axle electric machines is zero. The secondary axle electric machine speed derivative value is zero.

Referring now to FIG. 5B, a plot of an example secondary axle electric machine torque offset is shown. Plot 580 includes a vertical axis and a horizontal axis. The vertical axis represents the secondary axle electric machine torque offset. The horizontal axis represents the vehicle acceleration rate. Curve 585 shows one example of how the secondary axle electric machine torque offset that may be adjusted in response to a vehicle acceleration rate when change in the speed derivative of the secondary axle electric machine exceeds a threshold value. The secondary axle electric machine torque offset may increase as the vehicle acceleration rate increases so that when the dog clutch is commanded open, the secondary axle electric machine torque may be increased so that torque between the first and second halves of the dog clutch is low. The shape of curve 585 may be determined experimentally via accelerating the vehicle at different rates and disengaging the dog clutch at a threshold speed.

Referring now to FIG. 6, an example method for operating a vehicle driveline that includes a secondary axle with electrical propulsion power is shown. The method of FIG. 6 may be incorporated into and may cooperate with the system of FIGS. 1 and 2. Further, at least portions of the method of FIG. 6 may be incorporated as executable instructions stored in non-transitory memory while other portions of the method may be performed via a controller transforming operating states of devices and actuators in the physical world. The method of FIG. 6 is described for a single axle (e.g., a front axle of a four wheel drive vehicle), but the method may be applied to both front and rear axles. The vehicle is activated and operating during the sequence of FIG. 6.

At 602, method 600 determines vehicle operating conditions. Vehicle operating conditions may include, but are not limited to vehicle speed, driver demand torque, dog clutch operating state, the derivative of the secondary axle electric machine speed, and propulsion battery state of charge. Driver demand torque may be determined by sensing a position of an accelerator pedal and converting the sensed position into driver demand torque according to a function that is based on accelerator pedal position and vehicle speed. The driver demand torque may be a torque that is requested at the vehicle's wheels. Method 600 proceeds to 604 after determining vehicle operating conditions.

At 604, method 600 judges if the present vehicle speed is greater than a first threshold vehicle speed. In one example, the first threshold vehicle speed is a vehicle speed at which the efficiency of the secondary axle is less than a threshold efficiency. If vehicle speed is greater than the first threshold speed, then the answer is yes and method 600 proceeds to 606. Otherwise, the answer is no and method 600 proceeds to 630.

At 606, method 600 reduces torque output from the secondary axle electric machine at a predetermined rate. For example, if the secondary axle electric machine is outputting 100 Newton-meters (Nm) of torque, output of the secondary axle electric machine may be reduced by 10 Nm/second. The predetermined rate may be empirically determined and it may vary with vehicle speed and other vehicle conditions. Method 600 proceeds to 608.

At 608, method 600 provides the driver demand torque to vehicle wheels via torque output from the secondary axle electric machine and torque output of the primary axle electric machine. For example, if the driver demand torque is 400 N-m at the wheels and the secondary axle electric machine is providing 200 N-m at the front wheels, then the primary axle electric machine provides 200 N-m at the rear wheels. Further, as the torque output of the secondary axle electric machine is decreased, output torque of the primary axle electric machine is increased such that the net torque change is zero. That is, the portion of driver demand torque that is removed from output of the secondary axle electric machine is applied to the output of the primary axle electric machine so that the driver demand torque is met. This allows the vehicle to continue to accelerate even though torque output of the secondary axle electric machine is being reduced. Thus, the amount of wheel torque that is removed from the secondary axle by reducing output of the secondary axle electric machine is added to the primary axle by increasing output torque of the primary axle electric machine. Method 600 proceeds to 610.

At 610, method 600 judges if an absolute value of a derivative of a rotational speed of the secondary axle electric machine exceeds a threshold value. If so, the answer is yes and method 600 proceeds to 612. Otherwise, the answer is no and method 600 returns to 604.

At 612, method 600 maintains the torque output by the secondary axle electric machine at the time the absolute value of the derivative of the rotational speed of the secondary axle electric machine exceeded the threshold value plus an offset torque value. The offset torque value may vary with the vehicle acceleration rate as shown in FIG. 5B. For example, if the amount of torque output by the secondary axle electric machine is 10 N-m and the offset torque value is 2 N-m at the time the derivative of the rotational speed of the secondary axle electric machine exceeds the threshold, then the output of the secondary axle electric machine is adjusted to 12 N-m. By adjusting the output of the secondary axle in this way, a low amount of torque may be transferred across the dog clutch so that the dog clutch may be separated without generating a significant amount of noise. Method 600 proceeds to 614.

At 614, method 600 provides the driver demand torque to vehicle wheels via torque output from the secondary axle electric machine and torque output of the primary axle electric machine. For example, if the driver demand torque is 400 N-m at the wheels and the secondary axle electric machine is providing 12 N-m at the front wheels, then the primary axle electric machine provides 388 N-m at the rear wheels. This allows the vehicle to follow the driver demand torque even though torque output of the secondary axle electric machine is being maintained constant. Method 600 proceeds to 616.

At 616, method 600 commands open and opens the dog clutch of the secondary axle. By opening the dog clutch, the half shaft that is coupled to the dog clutch may rotate with the other wheel that is coupled to the secondary axle instead of the electric machine that is coupled to the secondary axle rotating. Consequently, little or no back EMF may be generated in the electric machine that is coupled to the secondary axle. The dog clutch may be opened via a shift fork and actuator. Method 600 proceeds to 618.

At 618, method 600 judges if the dog clutch of the secondary axle is open. If so, the answer is yes and method 600 proceeds to 620. Otherwise, the answer is no and method 600 returns to 512. Method 600 may judge that the dog clutch is open via a sensor or simply via the dog clutch being commanded to open.

At 620, method 600 deactivates the secondary axle propulsion source (e.g., an electric machine). The electric machine may be deactivated via ceasing to operate (e.g., not opening and closing) transistors within an inverter supplying electrical power to the electric machine. By deactivating the secondary axle propulsion source, energy may be conserved. Method 600 proceeds to 622.

At 622, method 600 provides the requested driver demand torque to vehicle wheels via the primary axle propulsion source (e.g., an electric machine or an internal combustion engine). Method 600 proceeds to 624.

At 624, method 600 judges if a vehicle deactivation request has been made. A vehicle deactivation request may be made via a human/machine interface (e.g., key switch, pushbutton, display panel, key fob, or a remote control device) or via an external controller. If method 600 judges that a vehicle deactivation request has been made, the answer is yes and method 600 proceeds to 626.

At 626, method 600 ceases to delivering power or fuel to the vehicle's propulsion sources (e.g., electric machines or internal combustion engines). Method 600 proceeds to exit.

At 630, method 600 judges if the present vehicle speed is less than a second threshold vehicle speed. The threshold speed may be less than 10 kilometers/hour, for example. If vehicle speed is less than the second threshold speed, then the answer is yes and method 600 proceeds to 632. Otherwise, the answer is no and method 600 proceeds to 640.

At 632, method 600 commands the dog clutch closed and closes the dog clutch of the secondary axle. By closing the dog clutch, the half shaft that is coupled to the dog clutch may rotate with a vehicle wheel and the secondary axle may transmit torque generated via the secondary axle electric machine (e.g. the electric machine that is coupled to the secondary axle). The dog clutch may be closed via a shift fork and an actuator. Method 600 proceeds to 634.

At 634, method 600 activates the secondary axle propulsion source (e.g., an electric machine). The electric machine may be activated via supplying power to the secondary axle electric machine via operating transistors within an inverter supplying electrical power to the electric machine. By activating the secondary axle propulsion source, torque may be delivered to wheels that are coupled to the secondary axle. Method 600 proceeds to 636.

At 636, method 600 provides the driver demand torque to vehicle wheels via torque output from the secondary axle electric machine and torque output of the primary axle electric machine. For example, if the driver demand torque is 400 N-m at the wheels, the secondary axle electric machine may provide 150 N-m of torque at the front wheels and the primary axle electric machine may provide provides 250 N-m at the rear wheels. In this way, the outputs of the primary axle electric machine and secondary axle electric machine may provide the requested driver demand power. Method 600 proceeds to 624.

At 640, method 600 provides the driver demand torque to vehicle wheels via torque output from the secondary axle electric machine and torque output of the primary axle electric machine if the dog clutch is engaged. Otherwise, method 600 provides the driver demand torque to vehicle wheels solely via the primary axle electric machine. Method 600 proceeds to 624.

Thus, a dog clutch of a secondary axle may be selectively engaged and disengaged so that driveline efficiency may be improved. Further, the dog clutch may be disengaged responsive to a derivative of a speed of an electric machine of the secondary axle so that audible noises and driveline torque disturbances may be reduced.

The method of FIG. 6 provides for a vehicle operating method, comprising: opening a dog clutch of a secondary axle via a controller in response to a derivative of a speed of an electric machine supplying power to the secondary axle exceeding a threshold level, where the dog clutch includes teeth on a first side of the dog clutch and on a second side of the dog clutch. The method includes where the first side of the dog clutch is directly coupled to a shaft that is directly coupled to a differential and where the second side of the dog clutch is directly coupled to a shaft that is coupled to a wheel when the dog clutch is open. The method further comprises deactivating the electric machine after opening the dog clutch when the dog clutch is open. The method includes where deactivating the electric machine includes ceasing to operate one or more switches of an inverter.

In some examples, the method further comprises maintaining a power output level of the electric machine in response to the derivative of the speed of the electric machine supplying power to the secondary axle exceeding the threshold level. The method further comprises increasing the power output level of the electric machine by a threshold amount of power. The method includes where threshold amount of power is adjusted responsive to a rate of vehicle acceleration. The method further comprises continuing to accelerate the vehicle via a primary axle while opening the dog clutch.

The method of FIG. 6 also provides for a vehicle operating method, comprising: accelerating a vehicle to a threshold speed via at least a portion of power provided to a secondary axle of the vehicle via an electric machine; reducing power output of the electric machine when the vehicle reaches the threshold speed; and opening a dog clutch of a secondary axle via a controller in response to a derivative of a speed of an electric machine exceeding a threshold level, where the dog clutch includes teeth on a first side of the dog clutch and on a second side of the dog clutch. The method further comprises ceasing to reduce power output of the electric machine and operating the electric machine to output an amount of power the electric machine output at the time the derivative of the speed of the electric machine supplying power to the secondary axle exceeded the threshold level plus an amount of offset power. The method includes where the offset power is varied responsive to a rate of acceleration of the vehicle. The method further comprises continuing to accelerate the vehicle via power provided to a primary axle during and after opening the dog clutch. The method further comprises deactivating the electric machine after opening the dog clutch when the dog clutch is open. The method includes where deactivating the electric machine includes ceasing to operate one or more switches of an inverter. The method further comprises maintaining a power output level of the electric machine in response to the derivative of the speed of the electric machine supplying power to the secondary axle exceeding the threshold level.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
opening a dog clutch of a secondary axle according to a command of a controller in response to a derivative of a speed of an electric machine supplying power to the secondary axle exceeding a threshold level, where the dog clutch includes teeth on a first side of the dog clutch and on a second side of the dog clutch.

2. The method of claim 1, where the first side of the dog clutch is directly coupled to a shaft that is directly coupled to a differential and where the second side of the dog clutch is directly coupled to a shaft that is coupled to a wheel when the dog clutch is open.

3. The method of claim 1, further comprising deactivating the electric machine after opening the dog clutch when the dog clutch is open.

4. The method of claim 3, where deactivating the electric machine includes ceasing to operate one or more switches of an inverter.

5. The method of claim 1, further comprising maintaining a power output level of the electric machine in response to the derivative of the speed of the electric machine supplying power to the secondary axle exceeding the threshold level.

6. The method of claim 5, further comprising increasing the power output level of the electric machine by a threshold amount of power.

7. The method of claim 6, where threshold amount of power is adjusted responsive to a rate of vehicle acceleration.

8. The method of claim 1, further comprising continuing to accelerate a vehicle with a primary axle while opening the dog clutch.

9. A vehicle operating method, comprising:
accelerating a vehicle to a threshold speed through at least a portion of power provided to a secondary axle of the vehicle from an electric machine;
reducing power output of the electric machine when the vehicle reaches the threshold speed; and
opening a dog clutch of a secondary axle according to a command of a controller in response to a derivative of a speed of an electric machine exceeding a threshold level, where the dog clutch includes teeth on a first side of the dog clutch and on a second side of the dog clutch.

10. The method of claim 9, further comprising ceasing to reduce power output of the electric machine and operating the electric machine to output an amount of power the electric machine output at a time the derivative of the speed of the electric machine supplying power to the secondary axle exceeded the threshold level plus an amount of offset power.

11. The method of claim 10, where the offset power is varied responsive to a rate of acceleration of the vehicle.

12. The method of claim 9, further comprising continuing to accelerate the vehicle through power provided to a primary axle during and after opening the dog clutch.

13. The method of claim 9, further comprising deactivating the electric machine after opening the dog clutch when the dog clutch is open.

14. The method of claim 13, where deactivating the electric machine includes ceasing to operate one or more switches of an inverter.

15. The method of claim 9, further comprising maintaining a power output level of the electric machine in response to the derivative of the speed of the electric machine supplying power to the secondary axle exceeding the threshold level.

16. A vehicle system, comprising:
a primary axle and a secondary axle, the secondary axle including a dog clutch having teeth and an actuator to open and close the dog clutch;
a first electric machine mechanically coupled to the primary axle and a second electric machine mechanically coupled to the secondary axle; and
a controller including executable instructions stored in non-transitory memory to accelerate a vehicle with the first and second electric machines, reduce power output of the second electric machine and increase output of the first electric machine when the vehicle reaches a threshold speed, and open the dog clutch when a derivative of a speed of the second electric machine exceeds a threshold level.

17. The vehicle system of claim 16, further comprising additional instructions to deactivate the second electric machine after opening the dog clutch.

18. The vehicle system of claim 16, further comprising additional instructions to maintain output of the electric machine when the derivative of the speed of the second electric machine exceeds the threshold level.

19. The vehicle system of claim 16, where the dog clutch is opened with the actuator.

20. The vehicle system of claim 16, further comprising additional instructions to close the dog clutch in response to vehicle speed being less than a threshold speed.

\* \* \* \* \*